United States Patent
Burton, Jr. et al.

[15] 3,683,675
[45] Aug. 15, 1972

[54] METHOD AND MEANS FOR LEAK DETECTION

[72] Inventors: Raymond V. Burton, Jr., Granada Hills; Eugene L. Giachino, Glendale, both of Calif.

[73] Assignee: Lockheed Aircraft Corporation, Burbank, Calif.

[22] Filed: Nov. 4, 1970

[21] Appl. No.: 86,973

[52] U.S. Cl. .................................................. 73/40.7
[51] Int. Cl. ............................................... G01m 3/20
[58] Field of Search ............................... 73/40.7, 40

[56] References Cited

UNITED STATES PATENTS 3,483,735   12/1969   Packo .................. 73/40.7

*Primary Examiner*—Louis R. Prince
*Assistant Examiner*—William A. Henry, II
*Attorney*—George C. Sullivan

[57] ABSTRACT

A method of leak detection in which a material such as benzoic acid is dispersed in air or nitrogen in a tank or container to be checked for leaks, the tank or container is then pressured and the dispersed material is allowed time to accumulate and deposit at all leak sites, the pressure is released and the interior of the tank or container is inspected for deposits of the material at the origin of the leaks.

5 Claims, No Drawings

METHOD AND MEANS FOR LEAK DETECTION

The present invention relates to leak detection and more particularly to a method of detecting leaks in a multilayered or channeling structure.

Many methods or techniques have been used in the past for detecting leaks in various structures. A few of the better known techniques are (1) air pressure and external bubble test, (2) air pressure and internal bubble test, (3) dye injection method, (4) vacuum and dye method, (5) air pressure box test, (6) vacuum bubble test, (7) exotic gas tests (8) air pressure and sound tests.

Many of these well-known procedures have been used to locate leak sources in aircraft, such as cabins, fuel tanks, etc. However, as the speed and range of the aircraft increase, so does the complexity of the structures. As a result, the sealing of integral laminar or channeled structures such as fuel tanks is very difficult and more and more time consuming. For instance, many of such structures cause a channeling of the leak and the external leak may be some distance from the origin.

Ideally, it would be desirable to detect the leak at the origin. Practically, detecting leaks at the origin is becoming more and more a necessity particularly with multi-layer structures. The leak detection must be fast, so that a visual inspection be preferred to a sniffer or similar device that may involve a general search of all areas suspected of causing a leak. A detection system should require few preparatory procedures and little or no cleanup after completion. The desirability and need of such a detection system can best be illustrated by the large number and variety of detection systems that have been developed and/or used in the past, some of which have been mentioned.

It is therefore an object of the invention to provide a leak detection system and method which is greatly simplified and more reliable.

A further object of the invention is to provide a method of leak detection which is fast and requires very little preparation.

Other objects, advantages, and features will become readily apparent from the following description and claims.

While the invention will be described in connection with an aircraft fuel tank, it will be understood that the method is applicable to many other enclosures, spaces, or containers. However, the invention is particularly applicable to aircraft fuel tanks wherein the tank is integral with the aircraft structure. The procedure is rather simple and is based on the discovery that fine floating particles in a pressurized container will collect and be deposited at any point of pressure drop (leak). Therefore, briefly, the invention requires only three basic steps:

1. Pressure the tank.
2. Create a fine particle suspension in the pressured tank. Allow sufficient time for accumulation of particles at the leak source.
3. Release pressure and visually identify all leak sources.

A more detailed description of a typical application follows. Please note that the term "smoke," as used herein, means a dispersion of fine floating particles in air or nitrogen.

1. The fuel tank is drained and all residual fuel is purged and/or baked out.

2. The tank is isolated as necessary for a pressure leak check and tested for any gross leaks (open fuel lines, etc.).

3. Place the material and heater in position. "Smoke" may be generated in a separate chamber and piped into the fuel tank, or it may be generated inside the fuel tank.

4. The tank is pressured and the heater is turned on to generate "smoke." Allow time for the "smoke" to accumulate and deposit at leak sites. Approximately one hour from the start of heating has been successful. Additional time may be necessary in some cases.

5. The heater is cooled and time is allowed for the "smoke" to settle. Pressure is released slowly.

6. The inside of the tank is inspected for leaks by noting where the "smoke" crystals have piled up at leaks.

7. "Smoke" material may be cleaned up by vacuum cleaning, washing with a solvent, or simply by heating the fuel tank.

The "smoke" material is preferably a sublimable material such as benzoic acid. This material exists as a fine needlelike crystal which is small enough to float with little or no air movement and can be generated in an external chamber or in the tank structure itself. To improve detection, a stable fluorescent additive may be incorporated which sublimes with the "smoke" material.

A number of other vaporizable or high volatile pressure materials may be used to generate the "smoke." The unique part of the detection system is the generating of "smoke" particles of such size and shape that two important characteristics are achieved. The particles must be small enough and light enough to float easily and float for long periods of time with only slight air movements. The particles must also be of such size and shape that they will "log jam" and pile up in an adherent manner at all leak points.

A few of the other materials which may be used are:
4-ethoxy-3-methoxy benzaldehyde
salicylic acid
p-bisphenol
durene
2,4 cresotic acid
p-isopropyl benzoic acid
d-camphor
o-methoxy benzoic acid The advantages of the leak detection system are believed apparent. The leaks are located at the true source of the leaks, whereas in the past the "leaks" may be noted some distance from the true origin. All leaks in a tank may be located with one application of "smoke." The residues are easily cleaned up, and if some chemicals are left, they are fuel-soluble and cause no trouble. Essentially, the chemicals used for "smoking" are non-toxic and non-corrosive. Also, the materials and equipment necessary for the system are inexpensive.

What is claimed is:

1. A method of leak detection for enclosures comprising the steps of dispersing a vaporizable material with an enclosure, raising the pressure within the enclosure, allow time for the material to accumulate and deposit at the leak sites, release the pressure and inspect the interior of the enclosure for accumulation of said material.

2. The method as defined by claim 1, wherein the material is a sublimable material such as benzoic acid.

3. The method as defined by claim 1, wherein the dispersion results in a smoke, or fine floating particles in a gaseous medium.

4. The method as defined by claim 1, and wherein the pressure is released slowly.

5. A leak detection system for enclosures comprising, an enclosure to be tested for leaks, means for vaporizing a material selected from the group consisting of benzoic acid, 4-ethoxy-3-methoxy-benzaldehyde, salicylic acid, p-bisphenol, durene, 2,4 cresotic acid, p-isopropyl benzoic acid, d-camphor, and o-methoxy benzoic acid, within the enclosure, means for raising the pressure within the enclosure, and after a predetermined time means for releasing said pressure, whereby the material is accumulated at the leak site.

* * * * *